(12) United States Patent
van Amelsfoort

(10) Patent No.: US 8,074,681 B2
(45) Date of Patent: Dec. 13, 2011

(54) SWIVEL AND ROTATOR MECHANISM FOR FLUID CONTROLLED MACHINES

(75) Inventor: Edward van Amelsfoort, Tilburg (NL)

(73) Assignee: Caterpillar Inc., Peoria, IL (US)

( * ) Notice: Subject to any disclaimer, the term of this patent is extended or adjusted under 35 U.S.C. 154(b) by 938 days.

(21) Appl. No.: 12/003,006

(22) Filed: Dec. 19, 2007

(65) Prior Publication Data

US 2008/0179482 A1 Jul. 31, 2008

(30) Foreign Application Priority Data

Dec. 27, 2006 (EP) .................................... 06127236

(51) Int. Cl.
*E21B 21/02* (2006.01)
*F16L 39/04* (2006.01)

(52) U.S. Cl. .................... 137/580; 285/121.3; 285/190; 285/273

(58) Field of Classification Search .................. 137/580, 137/275, 276, 277; 285/272, 273, 121.3, 285/190
See application file for complete search history.

(56) References Cited

U.S. PATENT DOCUMENTS

| | | | | |
|---|---|---|---|---|
| 2,953,151 A | * | 9/1960 | Snyder ........................... | 137/100 |
| 3,908,695 A | * | 9/1975 | Dunbar ......................... | 137/580 |
| 3,914,886 A | | 10/1975 | Berg et al. | |
| 5,829,479 A | * | 11/1998 | Kohno et al. .................. | 137/580 |
| 7,066,076 B2 | * | 6/2006 | Roy et al. ........................ | 92/106 |
| 7,083,200 B2 | * | 8/2006 | Falconer ..................... | 285/121.3 |
| 7,152,519 B2 | * | 12/2006 | Dubreuil ......................... | 92/106 |
| 2004/0244521 A1 | * | 12/2004 | Russ et al. ...................... | 74/425 |
| 2005/0017528 A1 | | 1/2005 | Ekman | |

FOREIGN PATENT DOCUMENTS

DE  20 2004 019909 U1  4/2006
WO  WO 96/26326  8/1996

OTHER PUBLICATIONS

European Search Report and Opinion dated Jul. 7, 2007, for Application No. 06127236.5 (5 pages).

* cited by examiner

*Primary Examiner* — Stephen M Hepperle
*Assistant Examiner* — Atif Chaudry

(57) ABSTRACT

A swivel for use in a rotator is disclosed. The swivel includes an inner member having a cylindrical portion and an annular outer member arranged around the inner member and rotatably connected thereto via a bearing. At least one of the inner member and the outer member is provided with an annular fluid channel, one of the members having a fastening flange with an upper and a lower flange surface. The flange includes attachment structure configured to fix the flange to a support structure. A first fluid path extends through the flange from a first opening in a circumferential face of the fastening flange, to the fluid channel. A second fluid path at least partially extends through the inner member in a substantially axial direction from the fluid channel to a second opening.

13 Claims, 3 Drawing Sheets

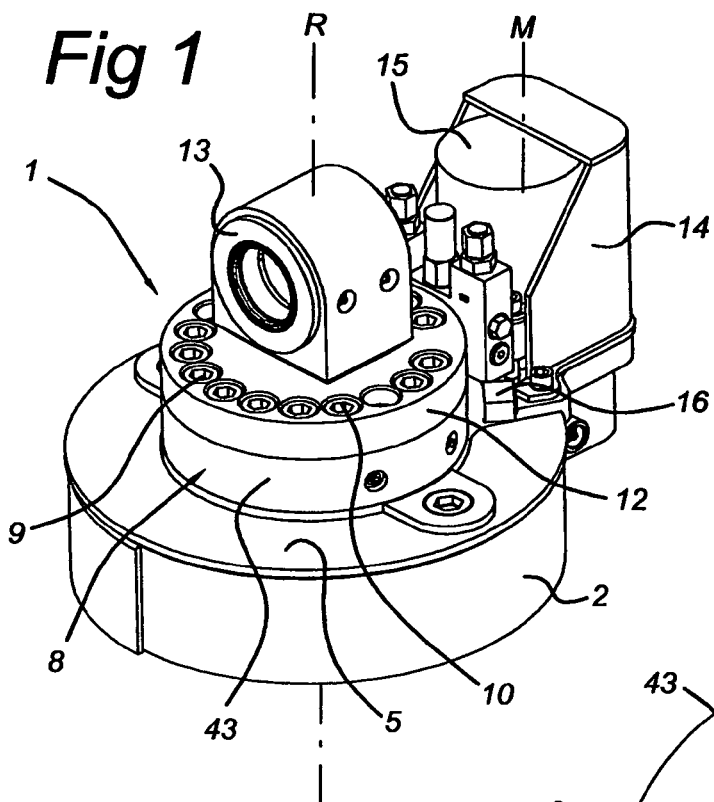
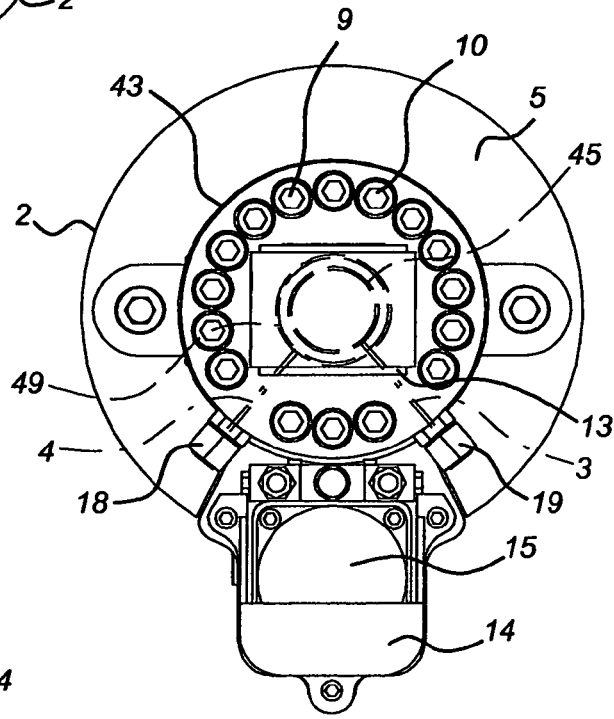
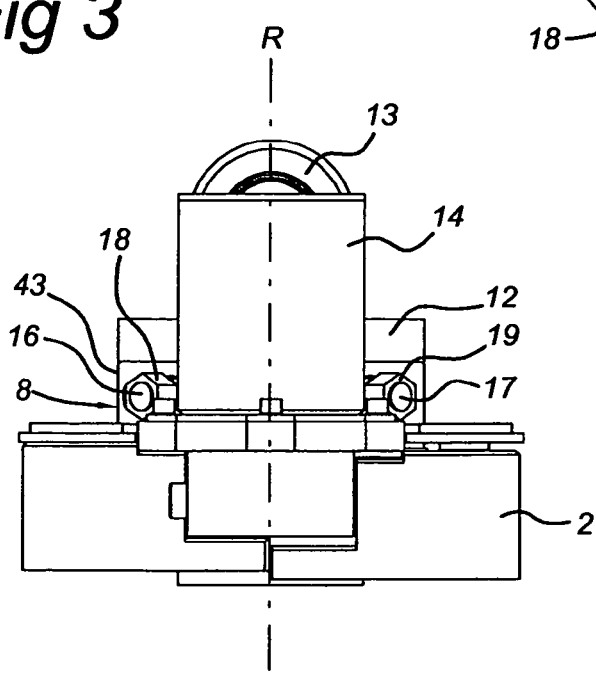

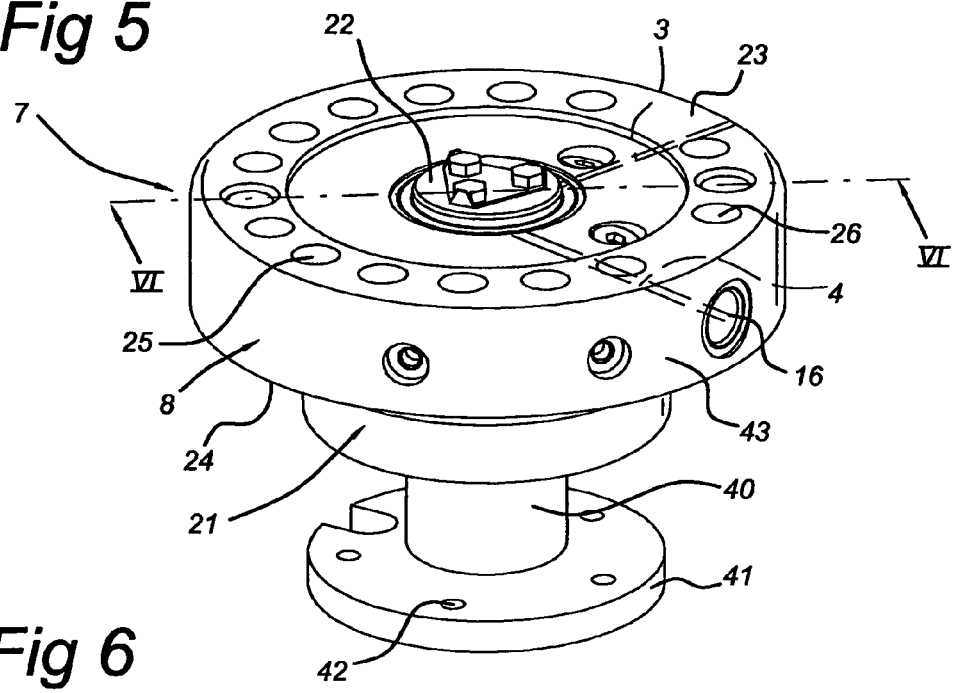
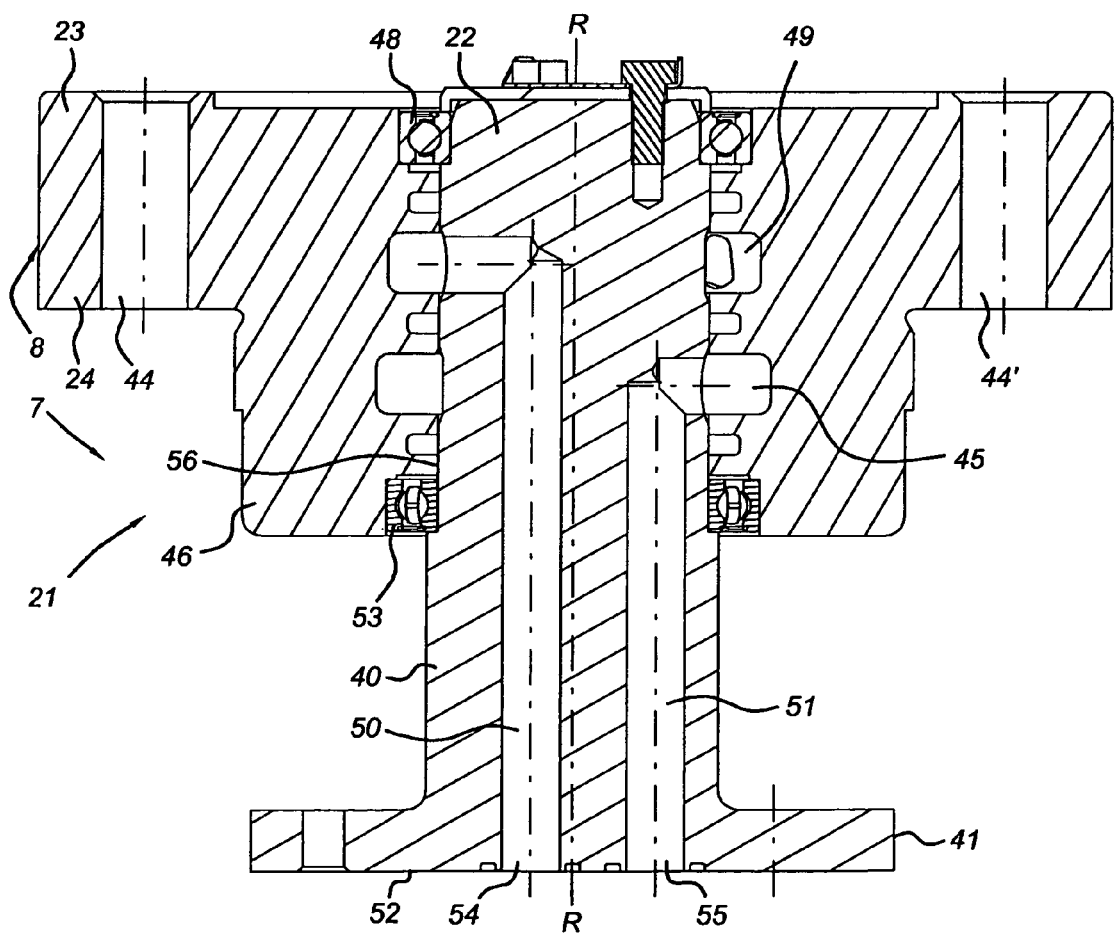

SWIVEL AND ROTATOR MECHANISM FOR FLUID CONTROLLED MACHINES

TECHNICAL FIELD

This disclosure relates to fluid controlled machines and, more particularly, to a swivel and rotator mechanism for a fluid controlled machine.

BACKGROUND

Fluid-powered work tools that are mounted on a machine via a rotator are known. For example, U.S. Patent Application Publication No. 2005/0017528 ("the '528 publication") discloses a hydraulic rotator that is connected to a crane arm via a hinged link. A log grapple is supported by the rotator. The rotator comprises a slew bearing that is driven by a drive motor and a hydraulic swivel that is accommodated within the central opening of the slew bearing. The slew bearing is surrounded by a protective housing and a widened inner annular part of the swivel is connected via bolts to a ring-shaped support of an open hinge bearing. Flexible hydraulic lines on the arm side of the machine are connected to axially extending fluid connectors of the swivel, whereas the grapple is connected to radially extending connectors of the swivel.

Although the mechanism of the '528 publication may enable desired relative rotational movement, the mechanism may be problematic. In the mechanism of the '528 publication, the connection of the arm to the rotator is of a relatively complex open hinge design in order to accommodate the hydraulic lines connecting the fluid source on the machine to the axially oriented fluid connectors on the swivel. The fluid connectors of the known swivel are situated between the hinge plates of the open hinge, which position is relatively difficult to reach during coupling and uncoupling. Furthermore, the known swivel is completely surrounded by a protective housing and is attached to the housing in a relatively complex manner, such that detaching the swivel for maintenance, inspection or exchange is relatively difficult.

The present disclosure is directed to one or more improvements in the existing technology.

SUMMARY

In one aspect, a swivel for use in a rotator includes an inner member having a cylindrical portion and an annular outer member arranged around the inner member and rotatably connected thereto via a bearing. At least one of the inner member and the outer member is provided with an annular fluid channel, one of the members having a fastening flange with an upper and a lower flange surface. The flange includes attachment structure configured to fix the flange to a support structure. A first fluid path extends through the flange from a first opening in a circumferential face of the fastening flange, to the fluid channel. A second fluid path at least partially extends through the inner member in a substantially axial direction from the fluid channel to a second opening.

In another aspect, a rotator includes an annular drive member with a central opening, a housing extending around the drive member having a top face and a central housing opening. A drive motor is attached to the housing and engages with the drive member. The swivel is mounted within the central opening of the drive member. The lower flange surface of the fastening flange is supported on the top face of the housing. The fastening flange is connected to the housing via the attachment structure.

BRIEF DESCRIPTION OF THE DRAWINGS

FIG. 1 shows a perspective view of an exemplary rotator according to a disclosed embodiment;

FIG. 2 shows a plan view of the rotator of FIG. 1;

FIG. 3 shows a side view of the rotator of FIG. 1;

FIG. 5 shows a perspective view of a swivel according to a disclosed embodiment; and FIG. 6 shows an axial cross-sectional view of the swivel of FIG. 5 through the line VI-VI.

DETAILED DESCRIPTION

Figure 4:
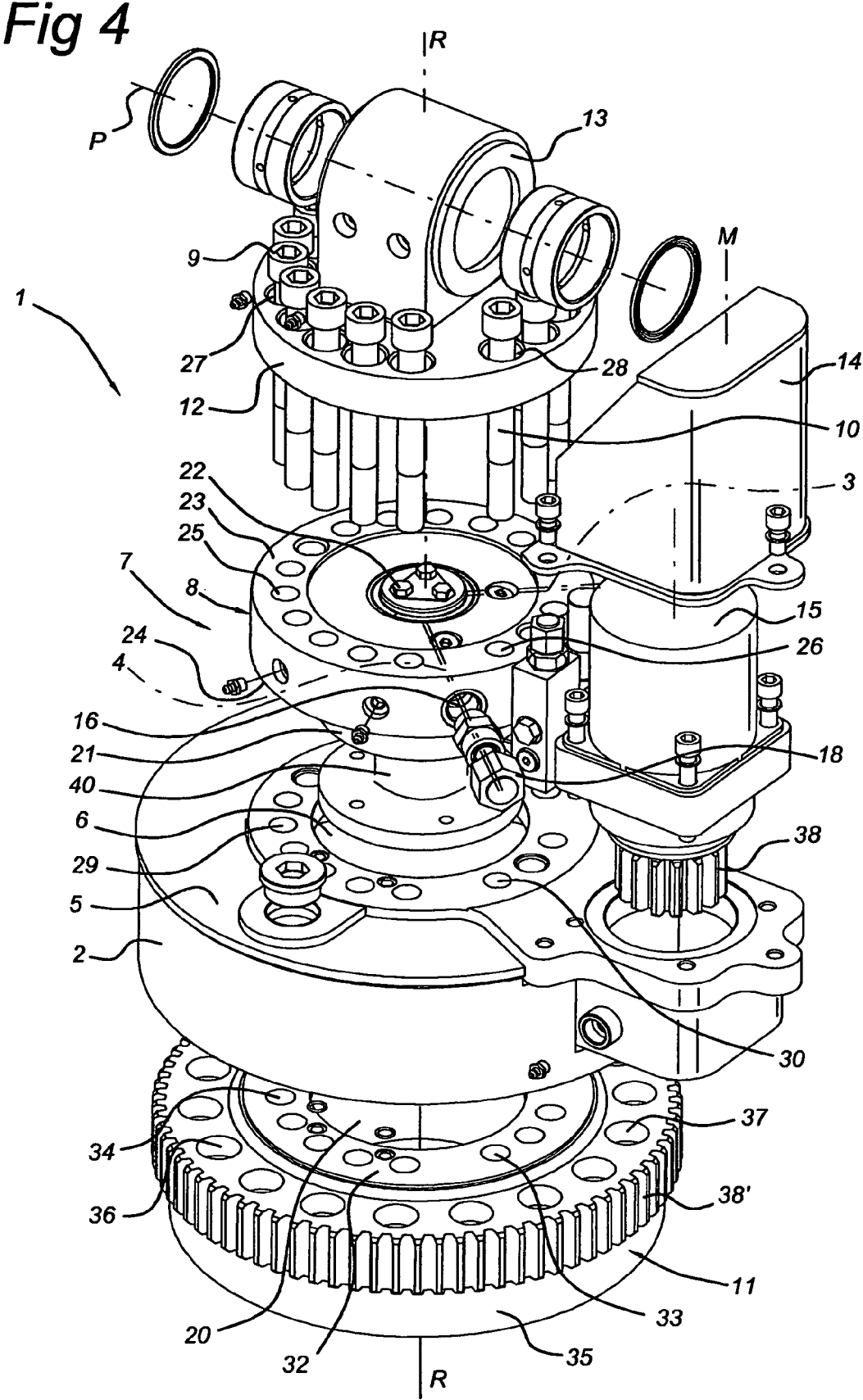
FIG. 4 shows an exploded view of the rotator of FIG. 1, including a hinge plate, a swivel, a housing, an annular drive member, and a drive motor.

FIG. 1 shows a rotator 1 with a protective housing 2. The housing 2 has a top face 5 with a central opening 6 in which a fluid swivel 7 (see FIG. 4) is accommodated. A fastening flange 8 of the fluid swivel 7 is connected to the top face 5 of the housing 2 via attachment structure in the form of a plurality of fastening members 9, 10 that may comprise bolts, tie-rods and the like. The fastening members 9, 10 extend through holes in the fastening flange 8 and through corresponding holes in a hinge bearing plate 12. The hinge bearing plate 12 overlies the end face of the fastening flange 8 and supports a pivot bearing 13 for connection to a pivot axis of for instance an arm of a hydraulic machine. A motor housing 14 supporting a drive motor 15 is attached in a peripheral position of the housing 2, a drive axis and pinion of the motor 15 being rotatable around an axis M. Via an opening in the housing 2, the drive axis of the motor 15 can act on an annular drive member 11 (see FIG. 4) having a central opening 20 and situated within the housing 2. A lower part 40 of the swivel 7 is accommodated within the central opening 20 of the drive member 11.

FIGS. 2 and 3 show a fluid inlet 16 and a fluid outlet 17 that are in fluid communication with connectors 18, 19 situated at the circumferential surface 43 of the swivel for attaching to fluid lines, such as hydraulic or pneumatic hoses, on a machine. As schematically indicated in FIG. 2, the openings 16, 17 are in fluid communication with annular fluid distributing channels 45, 49, via fluid paths 3, 4. The distributing channels 45, 49 and fluid paths 3, 4 have in this figure been schematically indicated by the dashed lines.

FIGS. 4 and 6 show that the connecting flange 8 of the swivel 7 is part of a relatively wide annular outer member 21 that rotatingly surrounds a cylindrical portion of the inner member 22 of the swivel. The connecting flange 8 has an upper flange surface 23 and a lower flange surface 24 supported on the top face 5 of the housing 2. A plurality of openings or holes 25, 26 extends in a generally axial direction from the upper flange surface 23 to the lower flange surface 24.

The fastening members 9, 10 extend through holes 27, 28 in the hinge bearing plate 12, through corresponding holes 25, 26 in the ring-shaped fastening flange 8 of the swivel 7 and through again corresponding holes 29, 30 in the top face 5, which holes are disposed on a circle with a diameter corresponding to the diameter of the circular arrangement of openings 27, 28 and 25, 26 in respectively the hinge bearing plate 12 and the connecting flange 8. The fastening members 9, 10 attach to an inner ring 32 of the annular drive member 11, via corresponding holes 33, 34. To the inner ring 32, an outer ring 35 is rotatably supported in an axial and in a radial direction via a bearing, the details of which are not shown in the drawing.

The outer ring 35 of the annular drive member 11 is provided with a plurality of coupling holes 36, 37 for attaching the ring 35 in a load-bearing manner to an implement having a fluid-powered member, for instance a hydraulic work tool, such as a grapple, a bucket, a crusher, a shear, and the like. The hydraulic work tool is rotationally connected via the outer ring 35 to the assembly of inner ring 32, the housing 5, the swivel 7, and the hinge bearing plate 12.

As can be seen from FIG. 4, the drive motor 15 comprises a pinion 38 which engages with corresponding teeth 38' on the circumference of the outer ring 35. When the pinion 37 is rotated around the axis M, the outer ring 35 will be driven around the axis R. The drive motor 15 may comprise an electrical motor or a hydraulic or pneumatic motor and is powered via an electrical or a fluid power supply on the machine to which the rotator 1 is coupled.

FIG. 5 shows the swivel 7 with the connecting flange 8, and holes 25, 26 extending from the upper flange surface 23 to the lower flange surface 24. The connecting flange 8 is part of the annular outer member 21 that is rotatably connected to the cylindrical inner member 22. The cylindrical inner member 22 is provided with the lower part 40 with a tool flange 41, for connection to an implement. By connecting the tool flange 41 to the implement, the inner member 22 is rotated relative to the annular outer member 21 when the drive motor 15 rotates the implement via the outer ring 35 of the drive member 11. Fluid passing from the rotationally stationary machine trough openings 16, 17 in the circumferential surface 43 of the swivel, in a generally radial direction, can travel in a generally axial direction through a duct in the cylindrical inner member 22 to a rotating part of the implement.

FIG. 6 shows the swivel 7 in a cross-sectional view. The annular outer member 21 comprises the relatively wide connecting flange 8 and a narrower body section 46. The body section 46 is supported on the cylindrical inner member 22 via a bearing 48. The body section 46 comprises two annular channels 45, 49 which are in fluid communication with respective fluid ducts 50, 51 extending in the inner member 22, which fluid ducts 50, 51 in the lower part 40 are oriented in a generally axial direction. The fluid ducts 50, 51 terminate in holes 54, 55 in an end face 52 of the inner member 22. A fluid seal 53 prevents hydraulic fluid from exiting the channels 45, 49 along the gap 56 between the rotating inner member 22 and stationary outer member 21.

INDUSTRIAL APPLICABILITY

The swivel according to the invention can be connected to the support structure, such as, for example, the housing of the slew bearing, via the connection flange. Thus, the fluid connectors are easily accessible. The fastening flange allows integration of the swivel with other rotator components, such a the housing, an inner slew bearing ring and/or a hinge plate, to form a compact integrated unit while maintaining easy access to the swivel fluid connectors.

The disclosed embodiment of a swivel, for example as shown in FIG. 5, can be integrated with a housing encasing the annular drive member 11, into a compact rotator in which the swivel is accommodated in a protected manner by supporting the swivel 7 with its lower flange surface 24 on the top face 5 of the housing 2. The body section 46 and the lower part 40 of the inner member 22 of the swivel are protected by the housing whereas the ring-shaped fastening member 8 rests on top of the housing. Hereby the connection members extending through the holes 25, 26, 44, 44' of the connecting flange 8 can be easily accessed and can fix a hinge bearing plate 12 to the substantially flat upper surface 23. The openings 16, 17 and oil connectors 18, 19 are situated at the circumferential face 43 of the swivel 7 and extend in a generally radial direction. This allows easy access upon connecting or disconnecting of fluid ducts to the connectors.

Hydraulic fluid coming from a machine may enter into the opening 16 to be passed to a fluid powered member of a tool connected to the rotator 1. The fluid can pass through the annular channel 45, via the axial duct 51 to a fluid powered member, irrespective of the relative angular positions of the inner member 22 and the outer member 23. Fluid returning from the fluid-powered member can travel through the axial duct 50 to the channel 49 and from the opening 17 back to a pump or reservoir on the machine.

It will be apparent to those skilled in the art that various modifications and variations can be made to the disclosed swivel and rotator for fluid controlled machines without departing from the scope of the disclosure. Other embodiments will be apparent to those skilled in the art from consideration of the specification and practice of the embodiments disclosed herein. It is intended that the specification and examples be considered as exemplary only, with a true scope of the disclosure being indicated by the following claims.

What is claimed is:
1. A rotator, comprising:
   a swivel including:
      an inner member having a cylindrical portion;
      an annular outer member arranged around the inner member and rotatably connected thereto via a bearing;
      at least one of the inner member and the outer member being provided with an annular fluid channel, one of the members having a fastening flange with an upper and a lower flange surface, the flange having an attachment structure;
      a first fluid path extending through the fastening flange from a first opening situated in a circumferential face of the fastening flange, to the fluid channel; and
      a second fluid path at least partially extending through the inner member in a substantially axial direction from the fluid channel to a second opening;
   an annular drive member with a central opening;
   a housing extending around the drive member and including a top face and a central housing opening;
   a drive motor associated with the housing and engaging the drive member, the swivel being mounted within the central opening of the drive member, the lower flange surface of the fastening flange being supported on the top face of the housing, and the fastening flange being connected to the housing via the attachment structure; and
   an inner ring within the central opening of the drive member, the drive member being connected to the inner ring in a rotating manner, the inner ring connecting to the housing and to the fastening flange of the swivel in a non-rotating manner.

2. A rotator according to claim 1, wherein the housing includes a plurality of holes around the central housing opening and the fastening flange of the swivel includes corresponding holes, and further including fastening members extending through corresponding holes in the fastening flange and the housing attaching the swivel to the housing.

3. A rotator according to claim 2, wherein:
   the drive member is rotatingly connected to the inner ring via a bearing,
   the inner ring includes holes corresponding to holes in the fastening flange of the swivel, and the fastening members extend through corresponding holes in the inner ring, holes in the housing, and holes in the fastening flange to connect the inner ring to the housing and to the fastening flange of the swivel in a non-rotating manner.

4. A rotator according to claim 3, further including a hinge bearing plate with a bearing for pivotal attachment to a hinge axis, the bearing plate including holes corresponding with holes in the connection flange of the swivel, and wherein the fastening members extend through corresponding holes of the bearing plate and the connection flange.

5. A rotator according to claim 2, further including a hinge bearing plate with a bearing for pivotal attachment to a hinge axis, the bearing plate including holes corresponding with holes in the connection flange of the swivel, and wherein the fastening members extend through corresponding holes of the bearing plate and the connection flange.

6. A machine, comprising:
a rotator including:
a swivel including:
an inner member having a cylindrical portion;
an annular outer member arranged around the inner member and rotatably connected thereto via a bearing;
at least one of the inner member and the outer member being provided with an annular fluid channel, one of the members having a fastening flange with an upper and a lower flange surface, the flange having an attachment structure;
a first fluid path extending through the fastening flange from a first opening situated in a circumferential face of the fastening flange, to the fluid channel; and
a second fluid path at least partially extending through the inner member in a substantially axial direction from the fluid channel to a second opening;
an annular drive member with a central opening;
a housing extending around the drive member and including a top face and a central housing opening; [[and]]
a drive motor associated with the housing and engaging the drive member, the swivel being mounted within the central opening of the drive member, the lower flange surface of the fastening flange being supported on the top face of the housing, and the fastening flange being connected to the housing via the attachment structure; and
an inner ring within the central opening of the drive member, the drive member being connected to the inner ring in a rotating manner, the inner ring connecting to the housing and to the fastening flange of the swivel in a non-rotating manner;
a machine fluid duct connecting a fluid pressure source on the machine to the first fluid path of the swivel via the first opening;
a tool connected to the drive member of the rotator, the tool including a fluid-powered member; and
a tool fluid duct connecting the second fluid path of the swivel to the fluid-powered member via the second opening.

7. A machine according to claim 6, wherein the housing includes a plurality of holes around the central housing opening and the fastening flange of the swivel includes corresponding holes, and further including fastening members extending through corresponding holes in the fastening flange and the housing attaching the swivel to the housing.

8. A machine according to claim 7, wherein:
the drive member is rotatingly connected to the inner ring via a bearing,
the inner ring includes holes corresponding to holes in the fastening flange of the swivel, and
the fastening members extend through corresponding holes in the inner ring, holes in the housing, and holes in the fastening flange to connect the inner ring to the housing and to the fastening flange of the swivel in a non-rotating manner.

9. A machine according to claim 7, wherein the inner member includes a tool flange with connecting structure configured for connection to a work tool, and wherein the tool is attached to the tool flange.

10. A machine according to claim 7, further including a hinge bearing plate with a bearing for pivotal attachment to a hinge axis, the bearing plate including holes corresponding with holes in the connection flange of the swivel, and wherein the fastening members extend through corresponding holes of the bearing plate and the connection flange.

11. A machine according to claim 10, the machine including a support member with a pivot axis, the rotator being pivotally connected to the pivot axis via the bearing of the bearing plate.

12. A machine according to claim 6, the machine including a support member with a pivot axis, the rotator being pivotally connected to the pivot axis via the bearing of the bearing plate.

13. A machine according to claim 12, wherein the inner member includes a tool flange with connecting structure configured for connection to a work tool, and wherein the tool is attached to the tool flange.

* * * * *